United States Patent
Zyren (10) Patent No.: US 8,258,649 B2
(45) Date of Patent: Sep. 4, 2012

(54) COMMUNICATING OVER POWER DISTRIBUTION MEDIA

(75) Inventor: James Zyren, Melbourne Beach, FL (US)

(73) Assignee: Qualcomm Atheros, Inc., San Jose, CA (US)

( * ) Notice: Subject to any disclaimer, the term of this patent is extended or adjusted under 35 U.S.C. 154(b) by 461 days.

(21) Appl. No.: 12/473,456

(22) Filed: May 28, 2009

(65) Prior Publication Data

US 2009/0299532 A1 Dec. 3, 2009

Related U.S. Application Data

(60) Provisional application No. 61/057,794, filed on May 30, 2008.

(51) Int. Cl.
 *H02J 3/00* (2006.01)
 *H02J 3/34* (2006.01)
 *H04B 3/54* (2006.01)

(52) U.S. Cl. ..................................... 307/4; 307/1; 307/3
(58) Field of Classification Search .................. 307/1, 3, 307/4
See application file for complete search history.

(56) References Cited

U.S. PATENT DOCUMENTS

| | | | |
|---|---|---|---|
| 6,628,673 B1 | 9/2003 | McFarland et al. | |
| 6,807,146 B1 | 10/2004 | McFarland | |
| 6,956,463 B2 | 10/2005 | Crenella et al. | |
| 7,009,348 B2 | 3/2006 | Mogilner et al. | |
| 7,009,527 B2 | 3/2006 | Seo | |
| 7,106,177 B2 | 9/2006 | Logvinov et al. | |
| 7,163,158 B2 | 1/2007 | Rossi et al. | |
| 7,295,626 B2 | 11/2007 | Chayat | |
| 7,296,426 B2 | 11/2007 | Butler et al. | |
| 7,518,487 B2 * | 4/2009 | Zalitzky et al. | 340/12.32 |
| 7,949,435 B2 * | 5/2011 | Pollack et al. | 700/291 |
| 2006/0022839 A1 * | 2/2006 | Hall et al. | 340/853.1 |

OTHER PUBLICATIONS

"HomePlug Command and Control Specification." *Homeplug Power Alliance*, Version 1.0, Aug. 26, 2007, pp. 1-65.
Yitran Presents HomePlug Command and Control v1.0. *Business Wire* on <http://www.BNET.com>. Nov. 26, 2007. 1 page.

* cited by examiner

*Primary Examiner* — Hal Kaplan
(74) *Attorney, Agent, or Firm* — DeLizio Gilliam, PLLC (57) ABSTRACT

A system includes a first communication module to be coupled to a first transmission medium for distributing power using a voltage waveform having a first amplitude; and a second communication module to be coupled to a second transmission medium for distributing power using a voltage waveform having a second amplitude different from the first amplitude, the second transmission medium being coupled to the first transmission medium. Each of the first and second communication modules is configured to use signals that propagate between the first and second transmission media.

20 Claims, 5 Drawing Sheets

COMMUNICATING OVER POWER DISTRIBUTION MEDIA

CROSS-REFERENCE TO RELATED APPLICATIONS

This application claims priority to U.S. Application Ser. No. 61/057,794, filed on May 30, 2008, incorporated herein by reference.

TECHNICAL FIELD

This description relates to communicating over power distribution media.

BACKGROUND

Power utility companies are deploying Smart Power Grid (or "Smart Grid") technologies as a means of increasing reliability and efficiency of existing electrical power generation and distribution infrastructure. Smart Grid technology includes network infrastructure for communicating with "smart meters" that are located at customer premises such as residences or other buildings for providing various monitoring and control functionality. For example, the smart meter can receive Demand Response (DR) signals originated from the power utility company, and can transmit information such as power consumption information to the power utility company. Smart meters can also be used to relay DR signals received from a power utility company to provide Command & Control (C&C) signals within the customer premises for controlling major electrical loads during peak demand periods. For example, "Load Shedding" is a technique that allows a public utility to control loads in order to reduce electrical demand at peak hours to avoid brown out and/or black out conditions.

SUMMARY

In one aspect, in general, a system includes: a first communication module to be coupled to a first transmission medium for distributing power using a voltage waveform having a first amplitude; and a second communication module to be coupled to a second transmission medium for distributing power using a voltage waveform having a second amplitude different from the first amplitude, the second transmission medium being coupled to the first transmission medium. Each of the first and second communication modules is configured to use signals that propagate between the first and second transmission media.

Aspects can include one or more of the following features.

The second transmission medium is coupled to the first transmission medium by a transformer.

The first transmission medium comprises at least a first length of wire, and the second transmission medium comprises at least a second length of wire.

The second transmission medium is coupled to the first transmission medium by at least a portion of the first length of wire being distributed in proximity to at least a portion of the second length of wire.

The second communication module is coupled to a thermostat and is configured to use signals to control the thermostat.

The first communication module is coupled to a power line.

The first communication module comprises a smart meter coupled to a Smart Power Grid.

The first communication module is configured to operate in a bandwidth, wherein at least a portion of the bandwidth is above about 15 MHz.

The first communication module is configured to use Orthogonal Frequency Division Multiplexing (OFDM).

The first communication module is configured to use Orthogonal Frequency Division Multiplexing (OFDM) and binary frequency shift keying (BFSK) modulation.

The second communication module is configured to use Orthogonal Frequency Division Multiplexing (OFDM).

The second communication module is configured to use binary frequency shift keying (BFSK) modulation.

The second communication module is configured to support data rates that are less than about 200 kbps.

The first transmission medium comprises an Alternating Current (AC) domestic power distribution medium.

The second transmission medium comprises a Heating, Ventilation, and Air Conditioning (HVAC) power distribution medium.

The first amplitude is in the range of about 100-240 Volts rms.

The second amplitude is about 24 Volts rms.

The first and second voltage waveforms have a frequency in the range of about 50-60 Hz.

In another aspect, in general, a method includes configuring a first communication module coupled to a Heating, Ventilation, and Air Conditioning (HVAC) power distribution medium to use signals that propagate between an Alternating Current (AC) domestic power distribution medium and the HVAC power distribution medium.

Aspects can include one or more of the following features.

The method further includes configuring a modulation scheme of a second communication module coupled to the AC domestic power distribution medium and configured to provide signals used by the first communication module.

Configuring the modulation scheme of the second communication module comprises selecting at least one pair of subcarrier frequencies for Frequency Shift Keying (FSK) modulation from a plurality of subcarrier frequencies used for Orthogonal Frequency Division (OFDM) modulation.

Selecting at least one pair of subcarrier frequencies comprises selecting a plurality of pairs of subcarrier frequencies.

The method further includes transmitting a given signal from the second communication module using FSK modulation on multiple pairs of subcarriers having the selected subcarrier frequencies.

The multiple pairs of subcarrier frequencies are separated from each other by a minimum number of intervening frequencies of subcarriers that are not used to transmit signals.

The method further includes spreading the pairs of subcarrier frequencies from each other over the plurality of subcarrier frequencies used for OFDM modulation to compensate for frequency selective fading on the power distribution media.

Configuring the first communication module comprises selecting one of the pairs of subcarriers on which the given signal is received based on a signal quality parameter.

The signal quality parameter comprises signal-to-noise ratio.

The method further includes using the selected pair of subcarriers to transmit signals from the first communication module using FSK modulation.

At least some of the selected pairs of subcarrier frequencies are adjacent frequencies separated by a frequency that is an inverse of a symbol time containing a whole number of periods of the sinusoidal waveform of each of multiple mutually orthogonal subcarriers.

The symbol time is used for generating symbols within signals sent between the second communication module and the first communication module.

The signals sent between the second communication module and the first communication module use FSK modulation.

A modulation index for at least some of the selected pairs of subcarrier frequencies is on the order of one.

A modulation index for at least some of the selected pairs of subcarrier frequencies is between about 0.6 and about 1.5.

A modulation index for at least some of the selected pairs of subcarrier frequencies is approximately equal to one.

The method further includes configuring a third communication module coupled to the AC domestic power distribution medium to use signals that propagate from the first communication module.

Configuring the modulation scheme of the second communication module comprises using Frequency Shift Keying (FSK) modulation for communication with the first communication module and using Orthogonal Frequency Division Multiplexing (OFDM) modulation for communication with the third communication module.

The method further includes configuring a third communication module coupled to the HVAC power distribution medium to use signals that propagate between the AC domestic power distribution medium and the HVAC power distribution medium.

The method further includes communicating in parallel between the first and second communication modules and between the first and third communication modules.

Configuring the modulation scheme of the second communication module comprises using a first pair of subcarrier frequencies for Frequency Shift Keying (FSK) modulation for communication with the first communication module and using a different second pair of subcarrier frequencies for Frequency Shift Keying (FSK) modulation for communication with the third communication module.

Configuring the modulation scheme of the second communication module comprises using Frequency Shift Keying (FSK) modulation for communication with the first communication module and using Orthogonal Frequency Division (OFDM) modulation for communication over a distribution cable from an AC domestic power grid.

In another aspect, in general, a method includes communicating with a Heating, Ventilation, and Air Conditioning (HVAC) device coupled to lower voltage power distribution wiring in a premises by coupling signals to higher voltage power distribution wiring in the premises without detecting the signals before coupling the signals between the higher voltage power distribution wiring and the lower voltage power distribution wiring.

In some aspects, the HVAC device comprises a thermostat.

In another aspect, in general, an apparatus comprises a communication module coupled to a Heating, Ventilation, and Air Conditioning (HVAC) power distribution medium configured to use signals that propagate between an Alternating Current (AC) domestic power distribution medium and the HVAC power distribution medium.

Among the many advantages of the invention (some of which may be achieved only in some of its various aspects and implementations) are the following.

Within customer premises, the Heating, Ventilation, and Air Conditioning (HVAC) system is typically the largest electrical load. HVAC systems are typically controlled by a thermostat. Existing "dumb" thermostats can be replaced with "smart" thermostats that include a communication module that is able to receive C&C signals relayed by a smart meter outside the customer premises. In some cases C&C signals from a smart meter are bridged to a different format (e.g., using a wired bridge or using a wireless technology such as Zigbee) for distribution of the C&C signals to thermostats and other devices within the customer premises.

The approaches described herein enable a smart meter to relay C&C signals to electrical loads within the customer premises directly over the existing power lines without requiring a bridge device to convert the C&C signals into a different format for distribution to communication modules at the electrical loads. Thus, the overall system complexity and cost can be reduced.

A power line communication module in a smart meter can use any of a variety of power line communication protocols, such as a HomePlug protocol (e.g., HomePlug 1.0 and HomePlugAV protocols for coupling to in-home power line networks, and HomePlug Broadband over Power Line (BPL) networks for coupling to a broadband backhaul network). Power line communications typically occur over a wide range of frequencies (e.g., in some cases in the range of about 2-28 MHz, or in some cases at lower frequencies such as below around 500 kHz). Signals from devices that use lower frequencies (e.g., below around 500 kHz) may not be able to traverse the step-down transformer between the HVAC and AC power domains as well as signals operating at higher frequencies (e.g., above around 10-15 MHz). Therefore signals at higher frequencies may be more reliable than signals at lower frequencies.

Equipping communication modules of electrical loads (called "C&C clients") with conventional power line communications capability would facilitate operations above, e.g., 15 MHz, would be robust against frequency selective fading, and would be interoperable with similar power line devices. Alternatively, in some cases, the high data rates (e.g. 1-200 Mbps) supported by power line protocols that use OFDM are not necessary for some low data rate communications such as typical C&C signals (e.g., about less than about 200 kbps, 100 kpbs, 10 kbps, or 1 kbps). For example, C&C signals can include simple commands such as "ON", "OFF", "Reduce Power Consumption by 50%." Thus, to further reduce cost in communication modules of C&C clients to be controlled, other modulation techniques such as Frequency Shift Keying (FSK) modulation can be used. The communication module in the C&C client can include a simple low-cost FSK radio, and the communication module in the smart meter can support both FSK modulation for communication with the C&C client and OFDM modulation for communication with the power utility company and with other power line devices within the customer premises. Such a system enables high rate power line devices to communicate directly with low rate C&C clients.

Other aspects and advantages will be apparent from the detailed description, drawings, appendices and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1A:
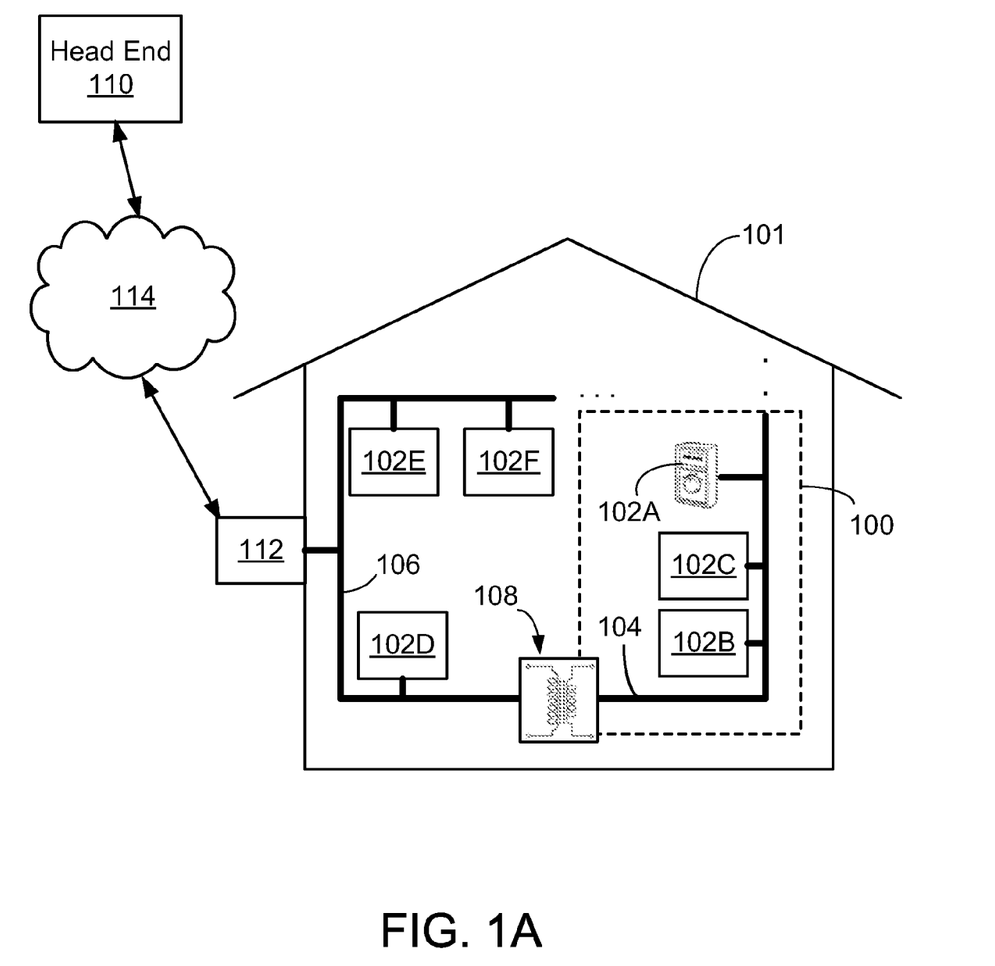
FIG. 1A is a schematic diagram of a customer premises in communication with a power utility company.

Referring to FIG. 1A, an HVAC system 100 in customer premises 101 is controlled using a control device 102A. Such control devices (e.g., thermostats) are typically powered by a 24 Volt waveform distributed over HVAC power distribution wiring 104. For example, the HVAC power distribution wiring 104 may consist of a pair of wires in a bundle consisting of several color-coded wires (e.g., blue, red, white, green, yellow, and brown). Typically, blue and red colored wires are used to provide the 24 Volt waveform for powering HVAC devices such as "smart" thermostats that include electronics to be powered (some "dumb" thermostats include a series of mercury switches and do not require power). The other wires in the bundle are used to provide some form of binary on/off control for an HVAC system (e.g., begin heating or cooling or turning on a fan) when one or more of them are shorted together (e.g., by a switch that forms a conductive path between them).

The 24 Volt waveform is derived from a higher voltage waveform of the AC domestic power distribution wiring 106 (at 120 Volts or 240 Volts, for example) through a step-down transformer 108. While in the past it has been assumed that existing thermostats would be replaced by "smart" thermostats that include wireless communications modules to receive C&C signals, tests have been performed to determine that typical insertion losses at typical power line communication frequencies (e.g., 20-30 MHz) from the AC domestic power distribution wiring 106 to the HVAC power distribution wiring 104 through a typical transformer are around 30 dB. In addition, test measurements in actual homes indicate that the actual insertion loss can be much lower, for example, about 15 dB at some points in a 2-28 MHz band. Without intending to be bound by theory, one possible explanation for why insertion losses can be lower in some homes is that increased coupling occurs between the AC domestic power distribution wires and the 24 Volt HVAC power distribution wires as they run along common paths as they are distributed around the home.

These levels of losses are surmountable using the techniques described herein to enable a smart meter to control HVAC devices (e.g., thermostats) directly over power lines without bridging C&C signals between the AC domestic power distribution medium and the HVAC power distribution medium (e.g., without using circuitry to detect and retransmit C&C signals or otherwise bypass the transformer).

Referring again to FIG. 1A, a power utility company head end 110 can communicate with a smart meter 112 or other Customer Premises Equipment (CPE) that serves as a gateway modem for receiving C&C signals. The communication network 114 between the head end 110 and the smart meter 112 is referred to as a "backhaul" network. C&C signals arrive over the backhaul network and are interpreted by the smart meter 112 to communicate with individual C&C clients within the customer premises including the HVAC control device 102A, other HVAC devices 102B-102C, and other devices 102D-102F connected to the AC domestic power distribution wiring 106 in the premises 101.

In many homes, detection of the C&C signals on one side of the transformer 108 and retransmission on the other side of the transformer 108 would require installation of a bridge device that detects and retransmits signals, e.g., using a different medium, a different protocol, or both. Eliminating the requirement for such a bridge device could facilitate conversion to a Smart Power Grid system (e.g., by saving time and cost of installing the bridge device). Instead of requiring a bridge device to be installed, by properly configuring the modulation scheme used by the smart meter 112, the C&C signals can be coupled to the AC domestic power distribution wires without detecting the signals before they couple to the HVAC power distribution wires (by direct uninterrupted propagation across the transformer from one medium to the other) and the C&C signals can be detected and used by an HVAC C&C client. Alternatively, in some homes, a passive bypass device may be installed to allow communication signals to bypass the transformer 108 without propagating through it. However, use of such a bypass device may require an installer to physically locate the transformer to install the bypass device. Eliminating the requirement for such a bypass device could also save time and cost.

There are a variety of waveforms that can be employed, such as various types of OFDM modulated waveforms, including HomePlug ROBO waveforms (e.g., as described in U.S. Pat. No. 6,278,685, incorporated herein by reference), to facilitate reliable bi-directional communications between a smart meter and a C&C client, including HVAC C&C clients.

In some implementations, single carrier direct sequence spread spectrum (DSSS) modulation can be employed. Regulatory requirements limit radiated emissions from power lines carrying communication signals. In the USA, this limit is −41 dBm/MHz. Use of a modulation scheme such as DSSS will allow the low data rate narrow band C&C signal to be spread over an arbitrary bandwidth, thereby allowing a much higher total transmitted power than would otherwise be possible. In some cases, use of DSSS helps mitigate the effects of multi-path interference.

The potential drawback to power line C&C systems operating at lower frequencies is that signals at lower frequencies do not couple across electrical phases in household wiring and they do not propagate onto the 24 Volt HVAC wiring system as well. Households are normally provided with 240 Volt AC electrical power, which is split at a distribution box into two waveforms having different phases operating at 120 Volt AC. In some cases, to increase reliability, power line communications devices communicate across both phases. As described above, C&C signals can reach a thermostat to control an HVAC system requires by propagating directly, without bridging from the AC domestic power distribution medium, through the step-down transformer. Experience has shown that higher frequencies (above 10-15 MHz) can be more reliable for both cross phase and AC domestic power to provide HVAC control communications.

In some implementations, the HVAC C&C clients can include communication modules that include 2-level or "binary" FSK (BFSK) radios. These radios will support low data rates (e.g., 24-120 kbps) which are adequate for the C&C application. In addition, FSK radios can be implemented extremely inexpensively compared to more flexible radios used in the smart meter, which also support OFDM modulation. Advanced signal processing capabilities already installed in power line communication devices (e.g., HomePlug devices) can be configured (e.g., using software, firmware, and/or hardware) to provide support for both OFDM modulation and FSK modulation. The end result is little or no marginal cost increase in the power line device to be used in a smart meter.

Figure 1B:
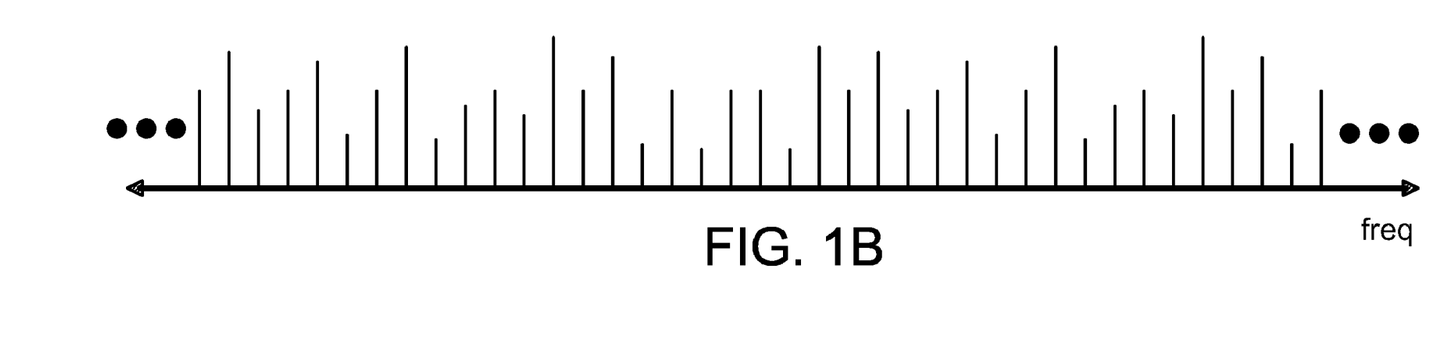
FIG. 1B is a plot of OFDM subcarrier frequencies.
Figure 1C:
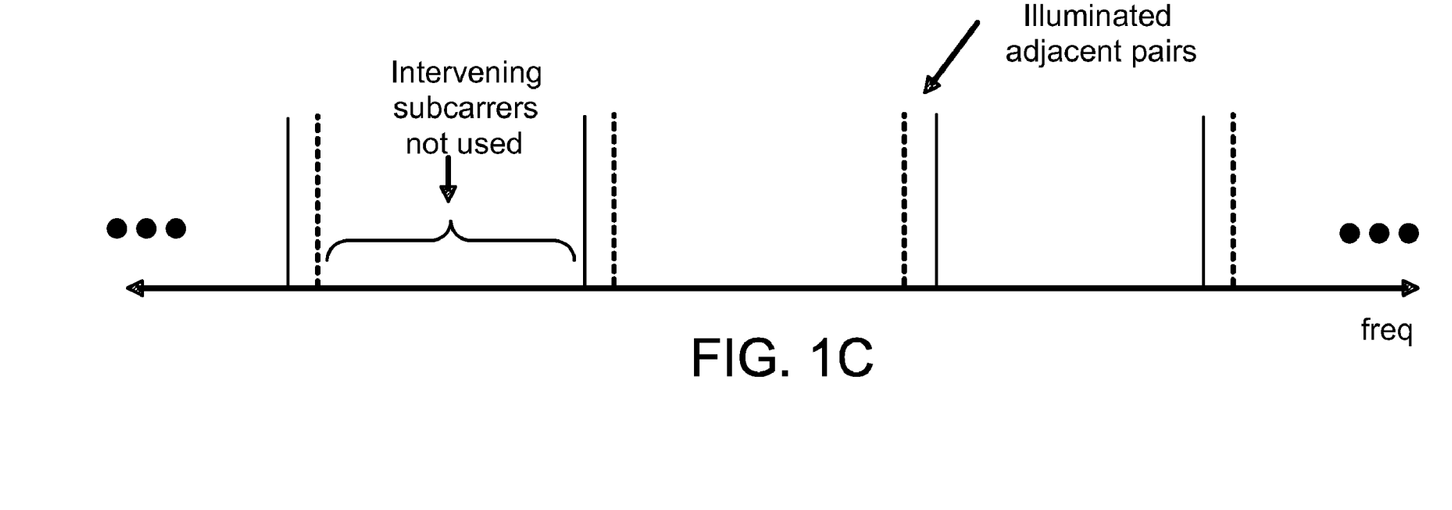
FIG. 1C is a plot of FSK channel frequencies.

By properly configuring the BFSK communication modules in the C&C clients and the modulation scheme used by the OFDM-based communication module in the smart meter, C&C communication can occur directly at the physical (PRY) layer without higher layer conversion of data modulation or encoding. For example, this can be accomplished by using a selected subset of existing OFDM subcarriers as mark tones (used to encode a binary value of "1" at a first frequency) and space tones (used to encode a binary value of "0" at a second frequency). FIG. 1B shows a typical set of OFDM subcarriers, which can each be modulated in amplitude and phase. Multiple pairs of subcarriers can be selected and used for multiple FSK channels to provide diversity for overcoming frequency dependent fading. By selecting substantially uniformly spaced adjacent subcarrier pairs, as shown in FIG. 1C, and leaving the intervening subcarriers off, channel spacing is relatively large, which minimizes the possibility of Adjacent Channel Interference (ACI). At the same time, there are still enough channels to ensure that low cost C&C devices on the client side could locate a narrowband channel that is not affected by frequency selective fading.

Figure 1D:
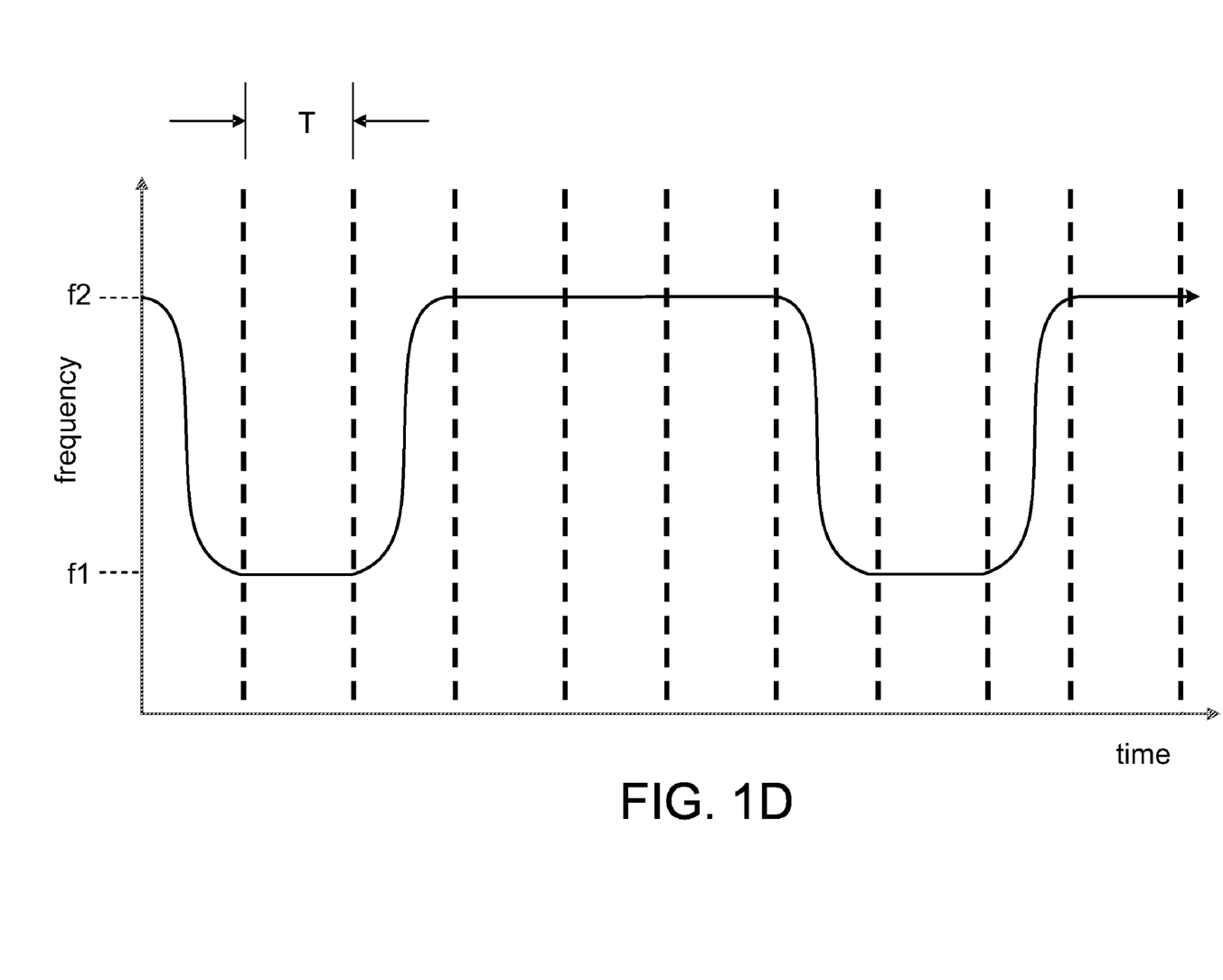
FIG. 1D is a plot of an FSK frequency trajectory.
Figure 1E:
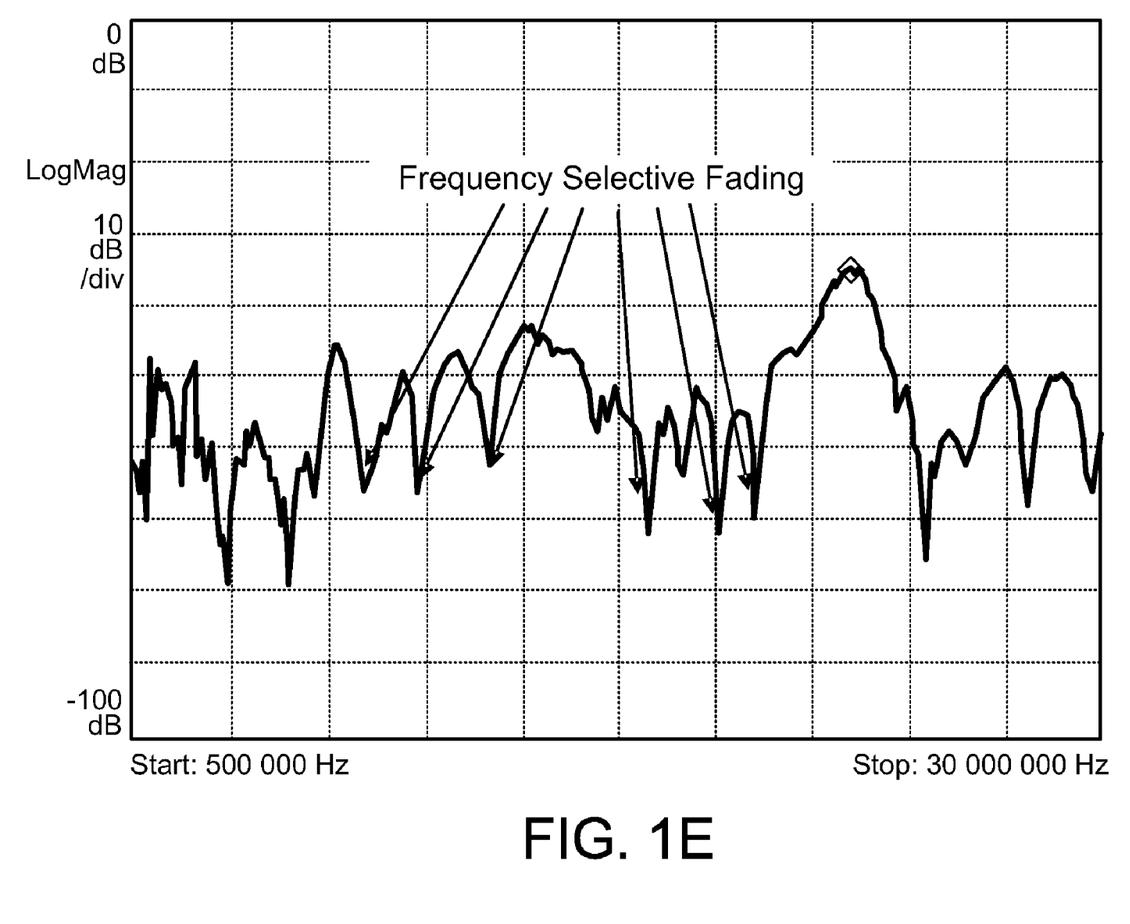
FIG. 1E is a plot of frequency selective fading.

The FSK C&C clients would be frequency agile, with the ability to change FSK channels quickly, in order to overcome frequency selective fading. During modulation on a given FSK channel, the frequency is changed between the mark and space frequencies. FIG. 1D shows an example of a frequency trajectory for FSK modulation. In some implementations, the frequency is smoothly transitioned between a mark frequency f2 and a space frequency f1 over a symbol time period T. FIG. 1E shows an example of frequency selective fading over a range of frequencies from 500 kHz to 30 MHz for a typical power line environment.

FSK radio performance is dependent on modulation index (frequency separation between mark & space frequencies divided by symbol rate). Subcarrier spacing in OFDM radios is intimately related to the symbol time (as described in more detail below). In order to achieve subcarrier orthogonality in the frequency domain, the subcarriers are spaced at a frequency that is the inverse of the symbol time. This means that for an FSK C&C client using adjacent subcarriers for mark & space tones, the modulation index is about 1.0 (or somewhat smaller or larger than 1.0 if different symbol time durations are used for OFDM and FSK signals), which results in very robust signaling. The FSK modulation parameters (e.g., mark & space frequency separation and symbol period) can be selected so that the existing parameters used for OFDM modulation (e.g., DFT parameters that determine the number of samples in a symbol, the symbol time, etc.) can be preserved.

By creating a relatively large number (e.g., 100) of substantially uniformly spaced FSK channels (each FSK channel consists of two adjacent subcarriers) and employing frequency agility, the FSK C&C client can be reliable in the presence of frequency selective fading. For example, during an acquisition phase, or at regular intervals, the smart meter can broadcast on all (or a predetermined subset of) FSK channels. The FSK C&C client can select the FSK channel with the best signaling characteristics (e.g., signal-to-noise ratio). This selected FSK channel may last for a relatively long time (e.g., many seconds) before it becomes necessary to select a new FSK channel (e.g., due to fading and/or increased noise). Further, multiple C&C clients are able to communicate in parallel with the smart meter (selecting different FSK channels) to reduce the impact of C&C communications on overall network throughput. Finally, by leaving the majority of subcarriers unused and illuminating substantially uniformly spaced subcarrier pairs, Adjacent Channel Interference ACI can be reduced when multiple clients are communicating with the smart meter via OFDMA techniques.

Any of a variety of communication system architectures can be used to implement the OFDM communication module in the smart meter that can be configured, as described above, to communicate using FSK modulation in addition to OFDM modulation. An application running on the smart meter provides and receives data to and from a network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Forward error correction (FEC) code line Viterbi codes, Reed-Solomon codes, concatenated code, turbo codes, low density parity check code, etc., can be employed by the PHY to overcome errors.

In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f = 1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
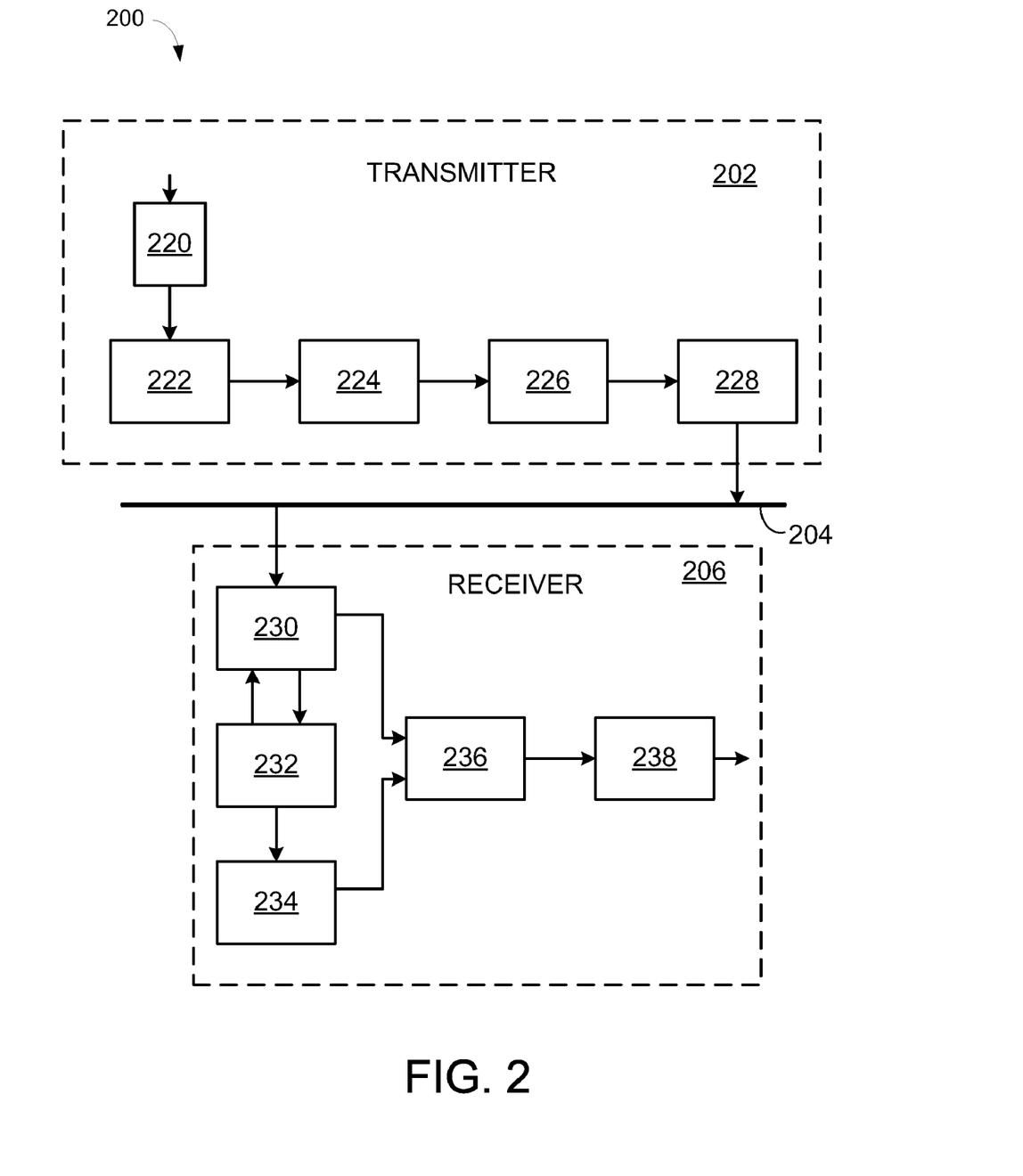
FIG. 2 is a block diagram of an exemplary communication system.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol.

This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi i n / N + \Phi_i)] \quad \text{Eq. (1)}$$

where the time index n goes from 1 to N, Ai is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol (also called a "guard interval"). The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function $g(\tau;t)$ representing an impulse response of transmission over the communication medium. The communication medium 204 may add noise n(t), which may be random noise and/or narrow-band noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

In some implementations, synchronization techniques can be used, for example, to synchronize communication to a power line cycle, as described in more detail in U.S. application Ser. No. 11/337,946, incorporated herein by reference. In some implementations, the power line medium can also be coupled to other media such as coaxial cable, as described, for example, in U.S. application Ser. No. 11/200,910, incorporated herein by reference.

Many other implementations of the invention other than those described above are within the invention, which is defined by the following claims.

What is claimed is:

1. A method, comprising:
   configuring a first communication module coupled to a Heating, Ventilation, and Air Conditioning (HVAC) power distribution medium to use signals that propagate between an Alternating Current (AC) domestic power distribution medium and the HVAC power distribution medium, wherein the signals are modulated according to a modulation scheme that enables direct uninterrupted propagation from the AC domestic power distribution medium to the HVAC power distribution medium;
   configuring a modulation scheme of a second communication module coupled to the AC domestic power distribution medium and configured to provide signals used by the first communication module according to the modulation scheme that enables direct uninterrupted propagation from the AC domestic power distribution medium to the HVAC power distribution medium;
   wherein said configuring the modulation scheme of the second communication module comprises selecting at least one pair of subcarrier frequencies for Frequency Shift Keying (FSK) modulation from a plurality of subcarrier frequencies used for Orthogonal Frequency Division (OFDM) modulation.

2. The method of claim 1, wherein said selecting at least one pair of subcarrier frequencies comprises selecting a plurality of pairs of subcarrier frequencies.

3. The method of claim 2, further comprising transmitting a given signal from the second communication module using FSK modulation on multiple pairs of subcarriers having the selected subcarrier frequencies.

4. The method of claim 3, wherein the multiple pairs of subcarrier frequencies are separated from each other by a minimum number of intervening frequencies of subcarriers that are not used to transmit signals.

5. The method of claim 3, further comprising spreading the pairs of subcarrier frequencies from each other over the plurality of subcarrier frequencies used for OFDM modulation to compensate for frequency selective fading on the power distribution media.

6. The method of claim 5, wherein configuring the first communication module comprises selecting one of the pairs of subcarriers on which the given signal is received based on a signal quality parameter.

7. The method of claim 6, wherein the signal quality parameter comprises signal-to-noise ratio.

8. The method of claim 6, further comprising using the selected pair of subcarriers to transmit signals from the first communication module using FSK modulation.

9. The method of claim 1, wherein at least some of the selected pairs of subcarrier frequencies are adjacent frequencies separated by a frequency that is an inverse of a symbol time containing a whole number of periods of the sinusoidal waveform of each of multiple mutually orthogonal subcarriers.

10. The method of claim 9, wherein the symbol time is used for generating symbols within signals sent between the second communication module and the first communication module.

11. The method of claim 10, wherein the signals sent between the second communication module and the first communication module use FSK modulation.

12. The method of claim 1, wherein a modulation index for at least some of the selected pairs of subcarrier frequencies is on the order of one.

13. The method of claim 12, wherein a modulation index for at least some of the selected pairs of subcarrier frequencies is between 0.6 and about 1.5.

14. The method of claim 13, wherein a modulation index for at least some of the selected pairs of subcarrier frequencies is approximately equal to one.

15. The method of claim 1, further comprising configuring a third communication module coupled to the AC domestic power distribution medium to use signals that propagate from the first communication module.

16. The method of claim 15, wherein said configuring the modulation scheme of the second communication module further comprises using Frequency Shift Keying (FSK) modulation for communication with the first communication module and using Orthogonal Frequency Division (OFDM) modulation for communication with the third communication module.

17. The method of claim 1, wherein said configuring the modulation scheme of the second communication module further comprises using Frequency Shift Keying (FSK) modulation for communication with the first communication module and using Orthogonal Frequency Division (OFDM) modulation for communication over a distribution cable from an AC domestic power grid.

18. A method, comprising:
configuring a first communication module coupled to a Heating, Ventilation, and Air Conditioning (HVAC) power distribution medium to use signals that propagate between an Alternating Current (AC) domestic power distribution medium and the HVAC power distribution medium, wherein the signals are modulated according to a modulation scheme that enables direct uninterrupted propagation from the AC domestic power distribution medium to the HVAC power distribution medium;
configuring a modulation scheme of a second communication module coupled to the AC domestic power distribution medium and configured to provide signals used by the first communication module according to the modulation scheme that enables direct uninterrupted propagation from the AC domestic power distribution medium to the HVAC power distribution medium;
configuring a third communication module coupled to the HVAC power distribution medium to use signals that propagate between the AC domestic power distribution medium and the HVAC power distribution medium;
communicating in parallel between the first and second communication modules and between the first and third communication modules;
wherein said configuring the modulation scheme of the second communication module comprises using a first pair of subcarrier frequencies for Frequency Shift Keying (FSK) modulation for communication with the first communication module and using a different second pair of subcarrier frequencies for Frequency Shift Keying (FSK) modulation for communication with the third communication module.

19. A system, comprising:
a first communication module coupled to a Heating, Ventilation, and Air Conditioning (HVAC) power distribution medium and configured to use signals that propagate between an Alternating Current (AC) domestic power distribution medium and the HVAC power distribution medium, wherein the signals are modulated according to a modulation scheme that enables direct uninterrupted propagation from the AC domestic power distribution medium to the HVAC power distribution medium;
a second communication module coupled to the AC domestic power distribution medium and configured to provide signals used by the first communication module according to the modulation scheme that enables direct uninterrupted propagation from the AC domestic power distribution medium to the HVAC power distribution medium;
wherein the second communication module configured to provide signals used by the first communication module according to the modulation scheme comprises the second communication module configured to select at least one pair of subcarrier frequencies for Frequency Shift Keying (FSK) modulation from a plurality of subcarrier frequencies used for Orthogonal Frequency Division (OFDM) modulation.

20. A system, comprising:
a first communication module coupled to a Heating, Ventilation, and Air Conditioning (HVAC) power distribution medium configured to use signals that propagate between an Alternating Current (AC) domestic power distribution medium and the HVAC power distribution medium, wherein the signals are modulated according to a modulation scheme that enables direct uninterrupted propagation from the AC domestic power distribution medium to the HVAC power distribution medium;
a second communication module coupled to the AC domestic power distribution medium and configured to provide signals used by the first communication module according to the modulation scheme that enables direct uninterrupted propagation from the AC domestic power distribution medium to the HVAC power distribution medium;
a third communication module coupled to the HVAC power distribution medium and configured to use signals that propagate between the AC domestic power distribution medium and the HVAC power distribution medium;

wherein the second communication module configured to provide signals used by the first communication module according to the modulation scheme comprises the second communication module configured to use a first pair of subcarrier frequencies for Frequency Shift Keying (FSK) modulation for communication with the first communication module and using a different second pair of subcarrier frequencies for Frequency Shift Keying (FSK) modulation for communication with the third communication module, wherein the communications between the first and second communication modules and between the first and third communication modules are in parallel.

* * * * *